(12) United States Patent  
Ezaki

(10) Patent No.: US 6,493,610 B1
(45) Date of Patent: Dec. 10, 2002

(54) FLIGHT INFORMATION PROVIDING APPARATUS, FLIGHT INFORMATION PROVIDING METHOD, FLIGHT INFORMATION PROVIDING PROGRAM, AND COMPUTER-READABLE RECORDING MEDIUM

(75) Inventor: Masayuki Ezaki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/143,929

(22) Filed: May 14, 2002

(30) Foreign Application Priority Data

May 15, 2001 (JP) ........................................ 2001-145210

(51) Int. Cl.[7] ............................................... G06F 17/00
(52) U.S. Cl. ........................................... 701/3; 701/201
(58) Field of Search ................................ 701/3, 29, 201, 701/16, 15, 213, 14, 35; 235/384, 492; 705/5, 6, 7

(56) References Cited

U.S. PATENT DOCUMENTS 6,173,159 B1 * 1/2001 Wright et al. ................. 701/29
6,278,913 B1 * 8/2001 Jiang ............................. 701/3
6,370,457 B1 * 4/2002 Nemeth ......................... 701/3
6,386,451 B1 * 5/2002 Sehr ........................... 235/384

* cited by examiner

Primary Examiner—Richard M. Camby
(74) Attorney, Agent, or Firm—Oblon, Spivak, McClelland, Maier & Neustadt, P.C.

(57) ABSTRACT

A flight information providing apparatus 10 is composed of an information provision request input section 12 for entering an information provision request 50; a storage section 18 for storing the information provision request 50 entered; a takeoff/landing information acquisition section 14 for acquiring actual flight information 60 on takeoff/landing of an airplane from an existing air-traffic control system; a passenger information acquisition section 16 for acquiring actual boarding information 70 on passengers aboard an airplane; an extraction section 20 for extracting takeoff/landing information by extraction processing of takeoff information and extraction processing of landing information; and a transmission section 22 for transmitting the takeoff/landing information thus extracted, through a communication network 40 to a terminal unit (a personal computer, a mobile telephone, etc.) 30 on the basis of a destination address about a predetermined person.

28 Claims, 13 Drawing Sheets

Fig.2A

APRIL 26

APRIL 25

| NAME | FLIGHT | DESTINATION ADDRESS | LANGUAGE | OTHER INFORMATION |
|---|---|---|---|---|
| TARO YAMADA | JXZ1 | aaa | JAPANESE | |
| KENT ALBEY | JXZ1 | bbb | ENGLISH | |
| KENICHI SUZUKI | FXX3 | ccc | JAPANESE | |
| KOICHI SATO | AAC5 | ddd | JAPANESE | |
| ⋮ | | | | |

Fig.2B

APRIL 26

APRIL 25

| NAME | FLIGHT | DESTINATION ADDRESS | LANGUAGE | OTHER INFORMATION |
|---|---|---|---|---|
| TARO YAMADA | JXZ1 | aaa | JAPANESE | |
| KENT ALBEY | JXZ1 | bbb | ENGLISH | |
| KENICHI SUZUKI | FXX3 | ccc | JAPANESE | CHANGED TO FLIGHT: FXX4 |
| KOICHI SATO | AAC5 | ddd | JAPANESE | NOT ABOARD |
| ⋮ | | | | |

*Fig.3*

| FLIGHT | TAKEOFF INFORMATION | DIFFERENCE FROM SCHEDULE | LANDING INFORMATION | DIFFERENCE FROM SCHEDULE | OTHER INFORMATION |
|---|---|---|---|---|---|
| JXZ1 | TOOK OFF | 10-MIN DELAY | NOT LAND | — | — |
| FXX3 | TOOK OFF | ON TIME | LANDED | ON TIME | — |
| AAC5 | TOOK OFF | ON TIME | LANDED | 120-MIN DELAY | LANDING AIRPORT: CHANGED FROM AB AIRPORT TO XY AIRPORT |
| ... | | | | | |

PASSENGER LIST OF JXZ1 — 70

| 1 | TARO YAMADA (17E) |
|---|---|
| 2 | HANAKO KATO (20D) |
| 3 | ICHIRO KONDO (2B) |
| 4 | KENT ALBEY (2A) |
| ⋮ | ⋮ |

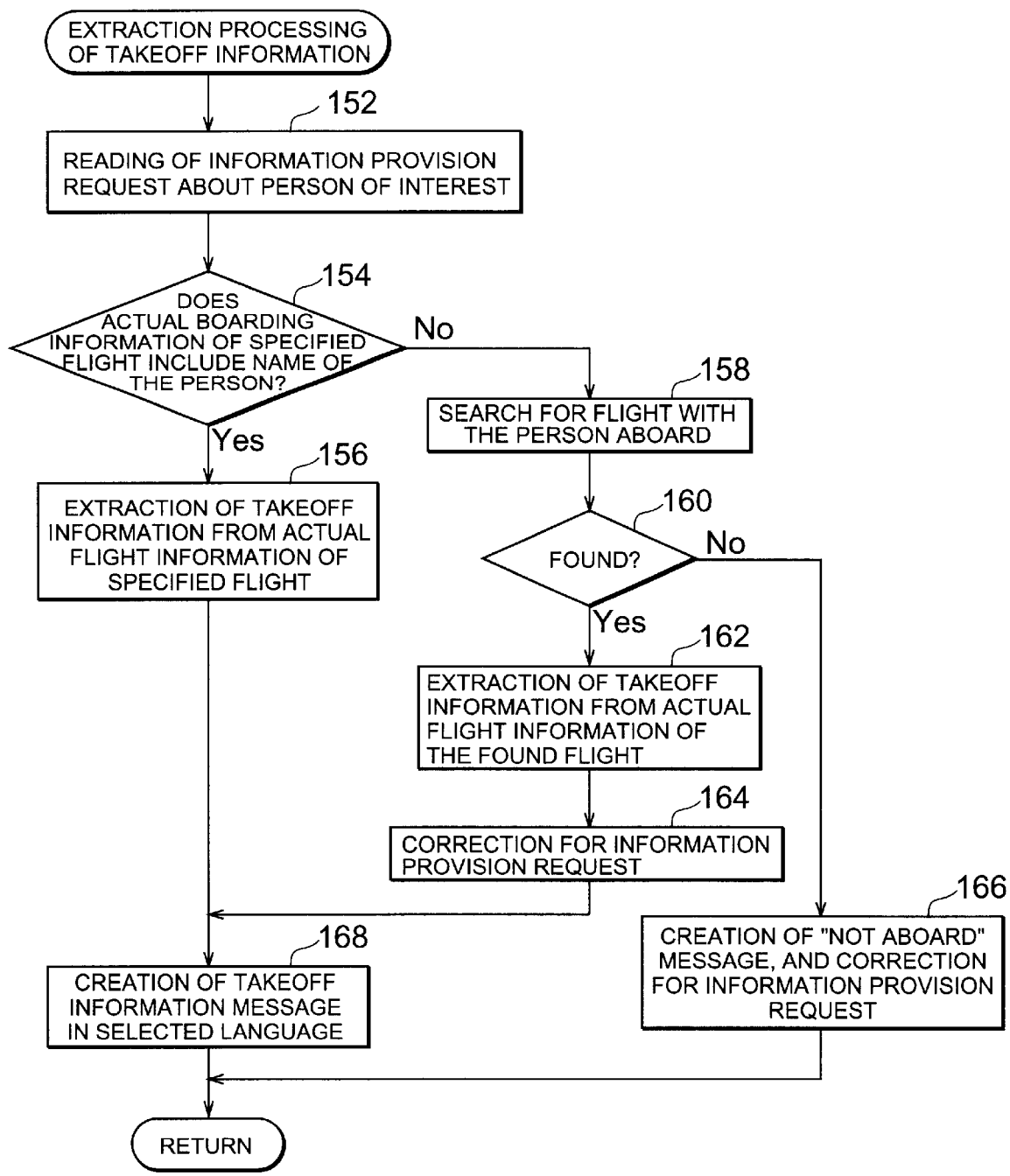

飛行機:JXZ1(成田発 サンフランシスコ行き)
搭乗者:アルビー ケント 様
予定より 10分 遅れで
離陸しました。

Fig.7B

Takeoff information

Airplane:JXZ1(From Narita to San Francisco)
Passenger:Kent Albey
Later than [ for 10 minutes] the schedule,
it took off.

Fig.9A

> 着陸情報
>
> 飛行機:JXZ1(成田発 サンフランシスコ行き)
> 搭乗者:アルビー ケント 様
> 予定より 20分 遅れで
> 無事到着しました。

Fig.9B

> Landing information
>
> Airplane:JXZ1(From Narita to San Francisco)
> Passenger:Kent Albey
> Later than [ for 20 minutes] the schedule,
> it came out to the San Francisco airport,
> and arrived safely.

FLIGHT INFORMATION PROVIDING APPARATUS, FLIGHT INFORMATION PROVIDING METHOD, FLIGHT INFORMATION PROVIDING PROGRAM, AND COMPUTER-READABLE RECORDING MEDIUM

BACKGROUND OF THE INVENTION

1. Field of the Invention

The present invention relates to a flight information providing apparatus, a flight information providing method, a flight information providing program, and a computer-readable recording medium for providing flight information on an airplane with a predetermined person aboard.

2. Related Background Art

In recent years, more and more people are using airplanes as means for movement on the occasions of overseas travels, domestic travels, business trips, and so on, and the age bracket of the users spans a wide spectrum from elderly people to children.

While the number of airplane users is increasing as described, the travel by plane still involves many unstable factors including occasional cancellation, delays of arrival times, etc. due to weather, e.g., typhoons or snow.

Under such circumstances, there are the potential needs of persons concerned with a certain passenger (e.g., a family, co-workers at a company, etc.) who want to make sure as early as possible whether the pertinent passenger got aboard an expected airplane and departed safely, or whether the pertinent passenger has arrived safely at a destination.

SUMMARY OF THE INVENTION

However, the actual flight information, e.g., indicating that the airplane has actually arrived with a delay of twenty minutes, is indicated on a bulletin board at an airport, and there is no existing service for automatically and promptly informing the persons concerned with the airplane passenger, of the information. For this reason, there are eager demands for implementation of such service.

The present invention has been accomplished to solve the above problem, and an object of the invention is to provide a flight information providing apparatus, a flight information providing method, a flight information providing program, and a computer-readable recording medium capable of automatically and promptly providing flight information about an airplane with a predetermined user aboard to a predetermined destination address corresponding to the pertinent user.

For achieving the above object, a flight information providing apparatus according to the present invention is a flight information providing apparatus adapted to provide flight information on an airplane with a predetermined person aboard, said flight information providing apparatus comprising: an information provision request input section for entering an information provision request including at least identification information on said person, identification information on an airplane that said person is supposed to go aboard, and a destination address to which the information is to be provided; a storage section for storing the information provision request entered; a takeoff/landing information acquisition section for acquiring actual flight information on takeoff/landing of an airplane; an extraction section for collating the identification information on the airplane that said person is supposed to go aboard, with said actual flight information thereof to extract landing information comprising arrival information indicating that said airplane has arrived, from said actual flight information; and a transmission section for transmitting the landing information of the object airplane extracted, to a terminal unit on the basis of the destination address about said person.

A flight information providing method according to the present invention is a flight information providing method adapted to provide flight information on an airplane with a predetermined person aboard, said flight information providing method comprising: an input step of entering an information provision request including at least identification information on said person, identification information on an airplane that said person is supposed to go aboard, and a destination address to which the information is to be provided; a storage step of storing the information provision request entered; an acquisition step of acquiring actual flight information on takeoff/landing of an airplane; an extraction step of collating the identification information on the airplane that said person is supposed to go aboard, with said actual flight information thereof to extract landing information comprising arrival information indicating that said airplane has arrived, from said actual flight information; and a transmission step of transmitting the landing information of the object airplane extracted, to a terminal unit on the basis of the destination address about said person.

A flight information providing program according to the present invention is a flight information providing program adapted to provide flight information on an airplane with a predetermined person aboard, said flight information providing program being configured to make a computer execute the following steps: an input step of entering an information provision request including at least identification information on said person, identification information on an airplane that said person is supposed to go aboard, and a destination address to which the information is to be provided; a storage step of storing the information provision request entered; an acquisition step of acquiring actual flight information on takeoff/landing of an airplane; an extraction step of collating the identification information on the airplane that said person is supposed to go aboard, with said actual flight information thereof to extract landing information comprising arrival information indicating that said airplane has arrived, from said actual flight information; and a transmission step of transmitting the landing information of the object airplane extracted, to a terminal unit on the basis of the destination address about said person.

Incidentally, the above-stated flight information providing apparatus, flight information providing method, and flight information providing program according to the present invention are based on the same technical concept and are interpretations of the technical concept from an aspect of the flight information providing apparatus, from an aspect of the flight information providing method, and from an aspect of the flight information providing program, respectively.

For this reason, the following will describe a solution to the problem by the flight information providing apparatus according to the present invention, but it is noted that solutions to the problem by the flight information providing method and the flight information providing program are also based on the same concept.

In the flight information providing apparatus according to the present invention, an operator enters through the information provision request input section, the information provision request including at least the identification information on the person, the identification information on the airplane that the person is supposed to go aboard, and the destination address to which the information is to be delivered, whereupon the storage section stores the information provision request thus entered. On the other hand, the takeoff/landing information acquisition section acquires the actual flight information about takeoff/landing of the airplane, whereupon the extraction section collates the identification information on the airplane that the person is supposed to go aboard, with the actual flight information. If the pertinent airplane has already arrived, the actual flight information at this time contains the arrival information indicating that the pertinent airplane has arrived. Thus the extraction section extracts the landing information including the arrival information, from the actual flight information. Then the transmission section transmits the landing information of the object airplane thus extracted, to the terminal unit on the basis of the destination address about the person included in the information provision request. This permits the apparatus to automatically and promptly provide the landing information indicating that the airplane with the predetermined person aboard has safely arrived, to the user of the terminal unit (a family, co-workers at a company, etc. of the person).

In the flight information providing apparatus, the extraction section is preferably configured to extract the landing information further comprising difference information between an estimated time of arrival and an actual time of arrival about the object plane. In the flight information providing method, the extraction step is preferably configured to extract the landing information further comprising difference information between an estimated time of arrival and an actual time of arrival about the object plane. In the flight information providing program, the extraction step is preferably configured to extract the landing information further comprising difference information between an estimated time of arrival and an actual time of arrival about the object plane.

In this case, the difference information between the estimated time of arrival and the actual time of arrival about the object airplane is also provided to the user of the terminal unit, so that the user can be informed of more specific actual flight circumstances of the object airplane.

In the flight information providing apparatus, the extraction section is preferably configured to extract the landing information further comprising information indicating that the object airplane has arrived at an airport different from an expected airport and information on the airport where the object airplane has arrived. In the flight information providing method, the extraction step is preferably configured to extract the landing information further comprising information indicating that the object airplane has arrived at an airport different from an expected airport and information on the airport where the object airplane has arrived. In the flight information providing program, the extraction step is preferably configured to extract the landing information further comprising information indicating that the object airplane has arrived at an airport different from an expected airport and information on the airport where the object airplane has arrived.

In this case, the information indicating that the object airplane has arrived at the airport different from the expected airport and the information on the arriving airport is also provided to the user of the terminal unit, so that the user can be informed of more specific actual flight circumstances of the object airplane.

In the flight information providing apparatus, preferably, a server further comprises a passenger information acquisition section for acquiring actual boarding information on passengers aboard an airplane, said extraction section is configured to collate the identification information on said person and the identification information on the airplane that the person is supposed to go aboard, with said actual boarding information and said actual flight information to extract takeoff information comprising boarding information indicating that said person has actually gone aboard the expected airplane and that the airplane has taken off, from said actual boarding information and said actual flight information, and said transmission section is configured to transmit the takeoff information of the person extracted, to said terminal unit. In the flight information providing method, preferably, said acquisition step is configured to also acquire actual boarding information on passengers aboard an airplane, said extraction step is configured to collate the identification information on said person and the identification information on the airplane that the person is supposed to go aboard, with said actual boarding information and said actual flight information to extract takeoff information comprising boarding information indicating that said person has actually gone aboard the expected airplane and that the airplane has taken off, from said actual boarding information and said actual flight information, and said transmission step is configured to transmit the takeoff information of the person extracted, to said terminal unit. In the flight information providing program, preferably, said acquisition step is configured to also acquire actual boarding information on passengers aboard an airplane, said extraction step is configured to collate the identification information on said person and the identification information on the airplane that the person is supposed to go aboard, with said actual boarding information and said actual flight information to extract takeoff information comprising boarding information indicating that said person has actually gone aboard the expected airplane and that the airplane has taken off, from said actual boarding information and said actual flight information, and said transmission step is configured to transmit the takeoff information of the person extracted, to said terminal unit.

In this case, the flight information providing apparatus acquires, not only the actual flight information, but also the actual boarding information about passengers aboard the airplane by the passenger information acquisition section, whereupon the extraction section collates the identification information on the airplane that the person is supposed to go aboard, with the actual boarding information to acquire the actual boarding information about the airplane that the person is supposed to go aboard, and the extraction section collates the identification information on the person therewith to extract the information indicating that the person has gone aboard the expected airplane. Besides it, the extraction section collates the identification information on the expected airplane, with the actual flight information to extract the information indicating that the pertinent airplane has taken off. In this way the extraction section extracts the takeoff information comprising the boarding information indicating that the person has gone aboard the expected airplane and that the airplane has taken off, and the transmission section transmits to the terminal unit the takeoff information of the person thus extracted. This permits the apparatus to automatically and promptly provide the takeoff information indicating that the predetermined person has gone aboard the expected airplane and that the pertinent airplane has safely taken off, to the user of the terminal unit (the family, the co-workers at the company, etc. of the person).

In the flight information providing apparatus, the extraction section is preferably configured to extract the takeoff information further comprising difference information between an estimated time of departure and an actual time of departure about the airplane that said person is supposed to go aboard. In the flight information providing method, the extraction step is preferably configured to extract the takeoff information further comprising difference information between an estimated time of departure and an actual time of departure about the airplane that said person is supposed to go aboard. In the flight information providing program, the extraction step is preferably configured to extract the takeoff information further comprising difference information between an estimated time of departure and an actual time of departure about the airplane that said person is supposed to go aboard.

In this case, the difference information between the expected time of departure and the actual time of departure about the object airplane is also provided to the user of the terminal unit, so that the user can be informed of more specific actual flight circumstances of the object airplane.

In the flight information providing apparatus, the extraction section is preferably configured to extract the landing information further comprising actual arrival information indicating that the airplane with said person actually aboard has arrived. In the flight information providing method, the extraction step is preferably configured to extract the landing information further comprising actual arrival information indicating that the airplane with said person actually aboard has arrived. In the flight information providing program, the extraction step is preferably configured to extract the landing information further comprising actual arrival information indicating that the airplane with said person actually aboard has arrived.

In this case, the actual arrival information indicating that the airplane with the pertinent person actually aboard has arrived is also provided to the user of the terminal unit, so that the user can be informed of more specific actual flight circumstances of the object airplane.

In the flight information providing apparatus, preferably, the information provision request comprises language selection information for selection of a language about the information transmitted from the transmission section, and the extraction section is configured to manipulate the extracted information so as to be displayed in a language according to the language selection information. In the flight information providing method, preferably, the input step is configured to enter the information provision request further comprising language selection information for selection of a language about the information transmitted at the transmission step, and the extraction step is configured to manipulate the extracted information so as to be displayed in a language according to the language selection information. In the flight information providing program, preferably, the input step is configured to enter the information provision request further comprising language selection information for selection of a language about the information transmitted at the transmission step, and the extraction step is configured to manipulate the extracted information so as to be displayed in a language according to the language selection information.

In this case, the landing information and the takeoff information manipulated so as to be displayed in the language preliminarily selected, is provided to the user of the terminal unit, so that the user can understand and know the actual flight circumstances of the object airplane more easily.

In the flight information providing apparatus, the flight information providing method, and the flight information providing program, the terminal unit as an information receiving unit is preferably a portable terminal having a function of entering said information provision request to deliver the request to said information provision request input section and receiving the information transmitted from said transmission section to display the information. In this case, the user can easily enter the information provision request through the portable terminal (e.g., a mobile telephone, a mobile terminal, or the like) widespread among many users and send it to the information provision request input section, and can also use the portable terminal in order to receive and display the information transmitted from the transmission section of the flight information providing apparatus. Therefore, the user can make simple and easy use of the information providing service by the flight information providing apparatus.

In the flight information providing apparatus, the flight information providing method, and the flight information providing program, the information provision request is preferably entered through the information provision request input section (or at the information provision request input step) when the person purchases an airline ticket or when the person checks in at an airport. Since these airline ticket purchase and check-in procedures are procedures that all the airplane users must be through, the configuration for permitting entry of the information provision request on the occasions of these procedures can provide chances of making use of the information providing service by the flight information providing apparatus, to all the airplane users, which can promote the utilization of the service.

A computer-readable recording medium according to the present invention is characterized in that the flight information providing program in either of the above configurations is recorded therein.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention may be more readily described with reference to the accompanying drawings, in which:

FIG. 2A is a diagram showing an example of the information provision request;

FIG. 2B is a diagram showing a state after correction of the information provision request;

FIG. 3 is a diagram showing an example of the actual flight information;

FIG. 4 is a diagram showing an example of the actual boarding information;

FIG. 6 is a flowchart showing a subroutine of extraction processing of takeoff information;

FIG. 7A is a diagram showing an example of a takeoff information message described in Japanese;

FIG. 7B is a diagram showing an example of a takeoff information message described in English;

FIG. 9A is a diagram showing an example of a landing information message described in Japanese;

FIG. 9B is a diagram showing an example of a landing information message described in English;

DESCRIPTION OF THE PREFERRED EMBODIMENTS

Figure 1:
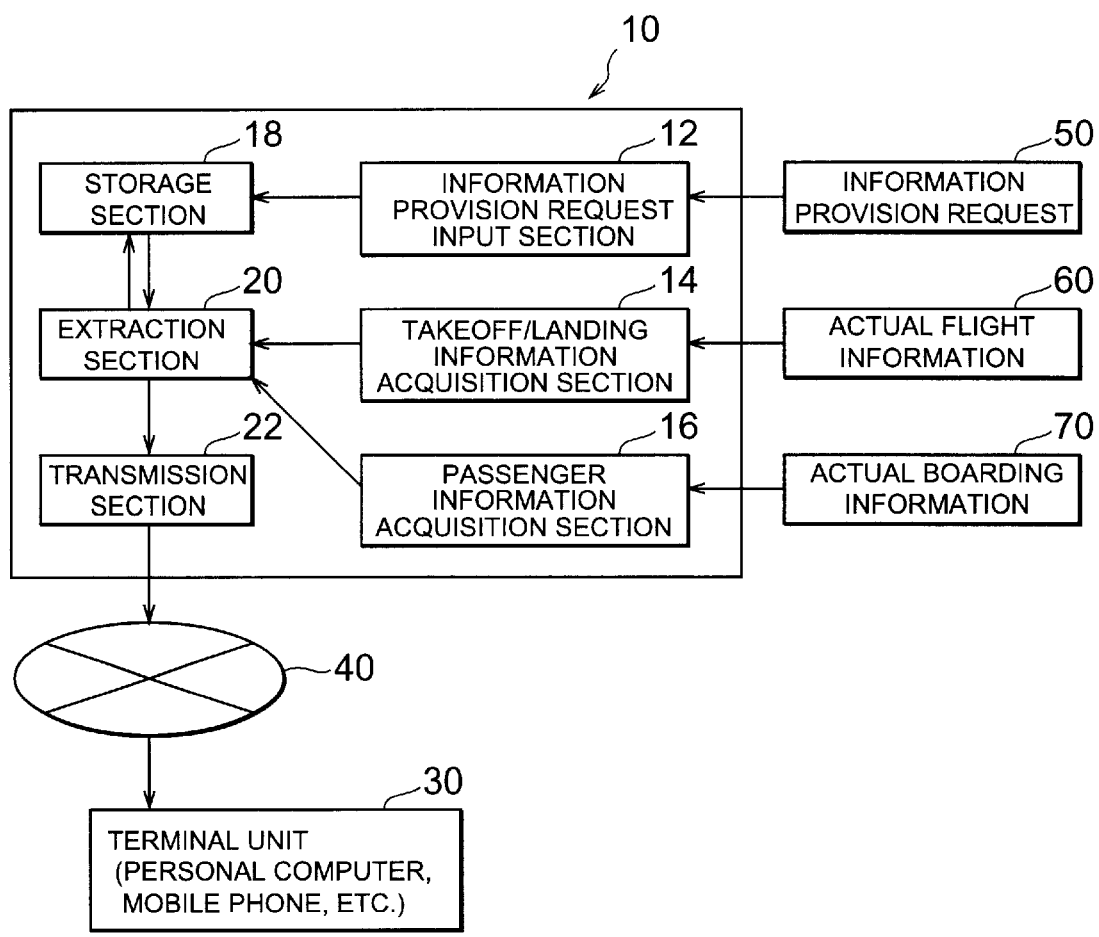
FIG. 1 is a block diagram showing the structure of the flight information providing apparatus in an embodiment of the invention.

The following will describe an embodiment of the flight information providing apparatus and the flight information providing method according to the present invention. FIG. 1 is a schematic illustration showing the entire structure of the flight information providing apparatus 10 comprised of a so-called server.

As shown in this FIG. 1, the flight information providing apparatus 10 comprises an information provision request input section 12 for entering an information provision request 50 (cf. FIGS. 2A, 2B) described hereinafter; a storage section 18 for storing the information provision request 50 entered; a takeoff/landing information acquisition section 14 for acquiring actual flight information 60 about takeoff/landing of each airplane (cf. FIG. 3) from an existing air-traffic control system; a passenger information acquisition section 16 for acquiring actual boarding information 70 on passengers actually aboard each airplane (cf. FIG. 4); an extraction section 20 for extracting takeoff/landing information by extraction processing of takeoff information and extraction processing of landing information described hereinafter; and a transmission section 22 for transmitting the takeoff/landing information extracted, through a communication network 40 to a terminal unit 30 on the basis of a destination address about a predetermined person of interest.

As shown in FIG. 2A, the information provision request 50 includes, for each person under a request for provision of information, a name of the person, a flight code of an airplane that the person is supposed to go aboard, a destination address to which the information is to be delivered, and language selection information, and is stored by scheduled boarding date in the storage section 18. This information provision request 50 is used in the extraction processing of the takeoff information and the extraction processing of the landing information by the extraction section 20. If a person has actually gone aboard an airplane different from an expected airplane, the extraction section 20 adds information about the change; for example, as in the data about "Kenichi Suzuki" in FIG. 2B, the extraction section 20 adds the information indicating "Changed to Flight: FXX4." If a person misses an expected airplane and is not on any airplane yet, the extraction section 20 adds information indicating "Not aboard," as in the data about "Koichi Sato" in FIG. 2B.

As shown in FIG. 3, the actual flight information 60 includes, for each flight, a flight code, takeoff information indicating whether an airplane has taken off or not, a difference from a scheduled takeoff time, landing information indicating whether an airplane has landed or not, a difference from a scheduled landing time, and other information (e.g., information on a change of a landing airport, etc.). In the example of FIG. 3, the flight: AAC5 is provided with additional information as other information: the information indicating that "Landing airport is changed from AB airport to XY airport."

As shown in FIG. 4, the actual boarding information 70 includes information on names and sheet numbers of passengers actually aboard each airplane.

The terminal unit 30 can be any equipment provided with a function of receiving information through the communication network 40 and displaying the received information; for example, it can be a personal computer, a mobile telephone, a mobile terminal, or the like.

Figure 5:
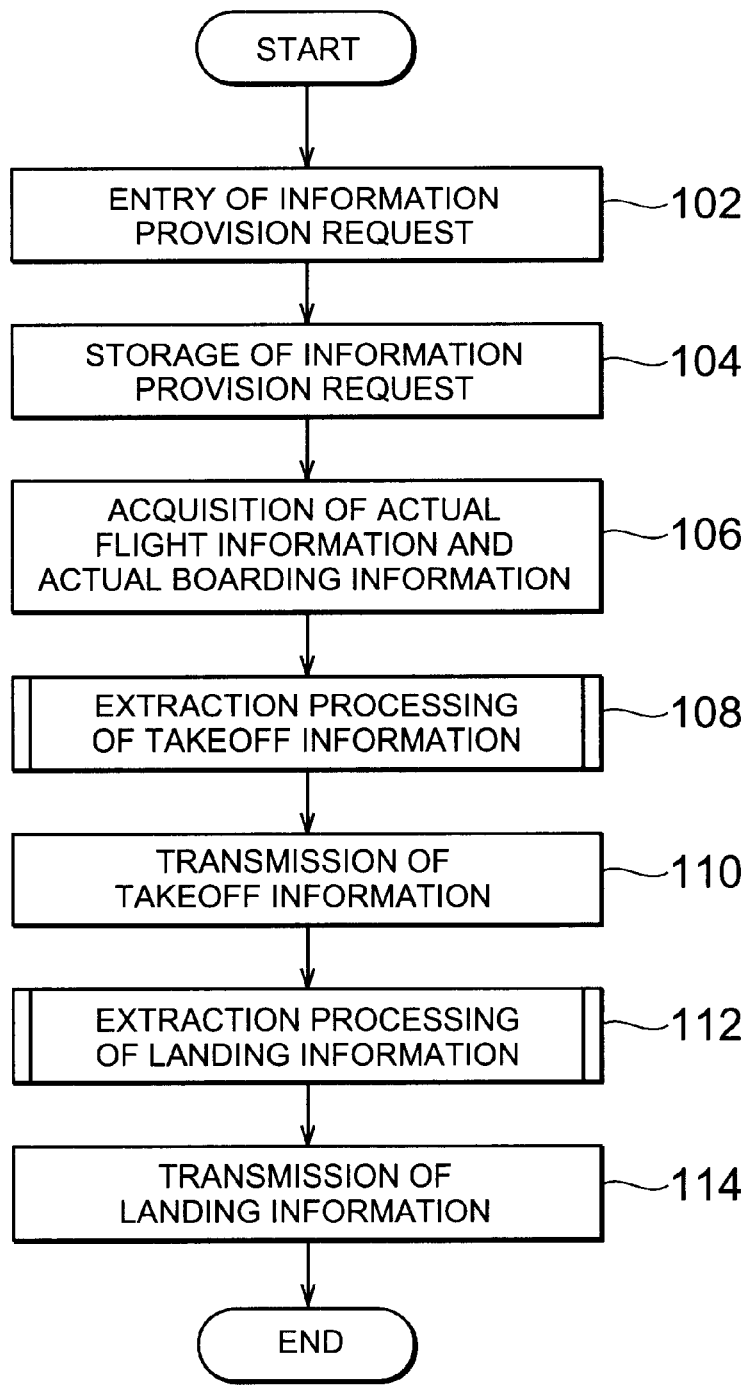
FIG. 5 is a flowchart showing the substance of processing carried out in the flight information providing apparatus.

The following will describe flight information providing processing executed in the flight information providing apparatus 10, as the operation of the present embodiment. FIG. 5 shows a main routine of the flight information providing processing, FIG. 6 a subroutine of the extraction processing of the takeoff information, and FIG. 8 a subroutine of the extraction processing of the landing information. The following will describe the processing up to provision of takeoff/landing information about a certain person under a request for provision of information.

In the flight information providing apparatus 10, the information provision request input section 12 first accepts input of the information provision request 50 at step 102 in FIG. 5, and then the storage section 18 stores the information provision request thus entered, at next step 104.

At step 106, the takeoff/landing information acquisition section 14 acquires the actual flight information 60 from the air-traffic control system (not shown) and the passenger information acquisition section 16 also acquires the actual boarding information 70 from the air-traffic control system. At next step 108, the extraction section 20 then executes the extraction processing of the takeoff information described below.

At step 152 in FIG. 6, the extraction section 20 collates a name of the person with the information provision request 50 stored in the storage section 18 to read the information provision request about the person out of the information provision request 50. Through this step, the extraction section 20 obtains the information about the flight code of the expected airplane that the person is supposed to go aboard, the destination address, and the language.

At next step 154 the extraction section collates the name with the actual boarding information 70 corresponding to the expected flight code of the person to determine whether the actual boarding information 70 of the pertinent flight includes the name.

When the information includes the name, it can be determined that the person has safely gone aboard the expected airplane. Thus the extraction section proceeds to step 156 to extract the information indicating whether the airplane has taken off or not and the information about the difference from the scheduled takeoff time, from the actual flight information 60 of the pertinent flight, and then goes to step 168 described later.

On the other hand, when at step 154 the actual boarding information 70 of the pertinent flight does not include the name of the person, it can be determined that the person did not go aboard the expected airplane, and thus the extraction section proceeds to step 158 to collate the name with the actual boarding information 70 of other flights to search for a flight with the person aboard. At step 160 the extraction section determines whether the search resulted in finding the name in the actual boarding information 70 of any other flight.

When the name is found in the actual boarding information 70 of another flight, the extraction section goes to step 162 to extract the information indicating whether the airplane has taken off or not and the information about the difference from the scheduled takeoff time, from the actual flight information 60 of the other flight (i.e., the actual boarding flight). At step 164 the extraction section then adds the information on the change of the flight, as in the data example of "Kenichi Suzuki" in FIG. 2B, to the information provision request 50 stored in the storage section 18, and then the extraction section proceeds to step 168. At step 168, the extraction section creates a takeoff information message in the language selected, based on the information indicating whether the airplane has taken off or not and the information on the difference from the scheduled takeoff time, which was extracted at above step 156 or step 162. For example, the takeoff information message as shown in FIG. 7A is created as a Japanese takeoff information message, and the takeoff information message as shown in FIG. 7B as an English takeoff information message. After that, the processing returns to the main routine of FIG. 5.

On the other hand, when step 160 ends in failing to find the name in the actual boarding information 70 of the other flights, it can be determined that the person did not go aboard any airplane, and thus the extraction section proceeds to step 166 to create a message telling that the person is not on any plane, in the selected language and add the information indicating "Not aboard," as in the data example of "Koichi Sato" in FIG. 2B, to the information provision request 50 stored in the storage section 18. After that, the processing returns to the main routine of FIG. 5.

At next step 110 in the main routine of FIG. 5, the transmission section 22 transmits the takeoff information message created by the above extraction processing of the takeoff information, through the communication network 40 to the terminal unit 30.

This permits the apparatus to automatically and promptly provide to the user of the terminal unit (the family, the co-workers at the company, etc. of the person), the takeoff information message described in the specified language, i.e., one of the takeoff information message indicating that the person has gone aboard the expected airplane and the airplane has safely taken off, the takeoff information message indicating that the person has gone aboard the airplane different from the expected airplane and the pertinent airplane with the person has taken off, and the message indicating that the person is not on any airplane.

At next step 112 in FIG. 5, the extraction section 20 executes the extraction processing of the landing information described below.

Figure 8:
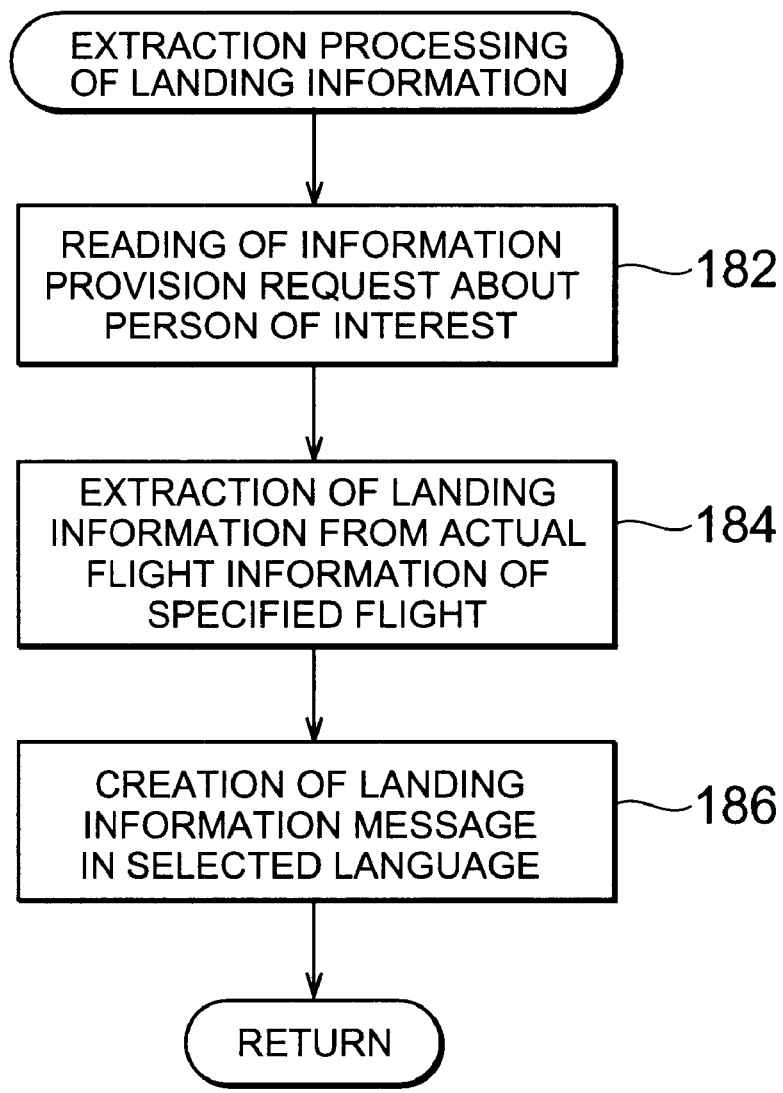
FIG. 8 is a flowchart showing a subroutine of extraction processing of landing information.

At step 182 in FIG. 8 the extraction section collates the name with the information provision request 50 stored in the storage section 18 to read the information provision request about the person out of the information provision request 50. This permits the extraction section 20 to obtain the flight code of the airplane with the person aboard, the destination address, the information on the language, and other information as additional information if any.

At next step 184, the extraction section collates the flight code of the airplane with the person aboard, with the actual flight information 60 to extract the actual flight information 60 of the pertinent flight and, based on the actual flight information 60 thus extracted, extracts the information indicating whether the airplane has landed or not, the information about the difference from the scheduled landing time, and other information.

At next step 186, the extraction section creates a landing information message in the selected language, based on the above extracted landing information. For example, the landing information message as shown in FIG. 9A is created as a Japanese landing information message, and the landing information message as shown in FIG. 9B as an English landing information. After that, the processing returns to the main routine of FIG. 5.

At next step 114 in the main routine of FIG. 5, the transmission section 22 transmits the landing information message created by the above extraction processing of the landing information, through the communication network 40 to the terminal unit 30.

This permits the apparatus to automatically and promptly provide to the user of the terminal unit (the family, the co-workers at the company, etc. of the person) the landing information message described in the specified language, i.e., the landing information indicating that the airplane with the person aboard has safely arrived.

The flight information providing processing as described above has permitted the automatic and prompt provision of the takeoff/landing information message described in the specified language to the user of the terminal unit (the family, the co-workers, etc. of the person), thereby fully meeting the needs of the users for provision of information.

Figure 10:
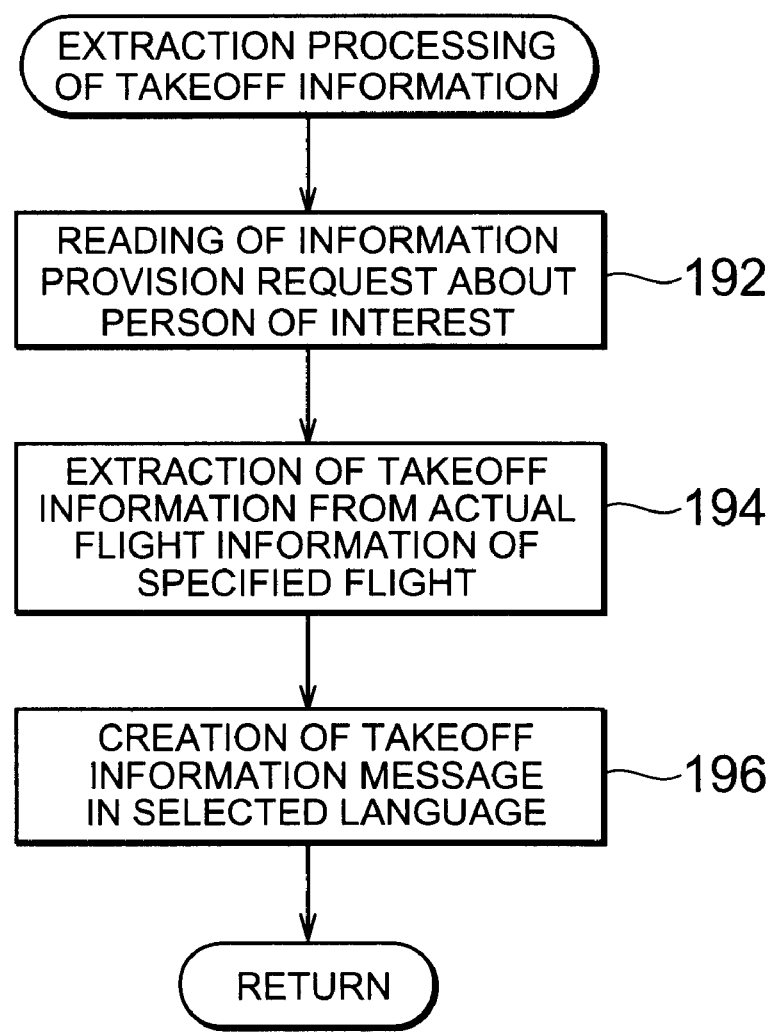
FIG. 10 is a flowchart showing another example of the subroutine of extraction processing of takeoff information.

The extraction processing of the takeoff information in FIG. 6 can be replaced by simplified processing as shown in FIG. 10. At step 192 in FIG. 10, the extraction section collates the name with the information provision request 50 stored in the storage section 18 to read the information provision request about the person out of the information provision request 50. Through this step, the extraction section 20 obtains the information on the flight code of the expected airplane that the person is supposed to go aboard, the destination address, and the language.

At next step 194 the extraction section extracts the information indicating whether the airplane has taken off or not and the information on the difference from the scheduled takeoff time, from the actual flight information 60 corresponding to the flight code of the expected airplane of the person, and at next step 196 the extraction section creates a takeoff information message in the selected language, based on the information indicating whether the airplane has taken off or not and the information on the difference from the scheduled takeoff time, which was extracted at the previous step. For example, the takeoff information message as shown in FIG. 7A is created as a Japanese takeoff information message, and the takeoff information message as shown in FIG. 7B as an English takeoff information message. After that, the processing returns to the main routine of FIG. 5.

In this embodiment, different from the processing of FIG. 6, the takeoff information message is created on the premise that the person must have gone aboard the flight of the expected airplane, without reference to the actual boarding information. For that reason, there is no need for the configuration associated with the entry of and reference to the actual boarding information and the takeoff information message can be created and transmitted in a simple configuration, though this configuration is not adapted to the event that the person misses the expected flight. However, if the person should miss the expected flight, the person must voluntarily inform the family, the co-workers, etc. of the fact. Therefore, the message telling the missing event is not a must in the information provision processing according to the present invention, and the above simple configuration can fully meet the needs of typical users.

Finally, the following will describe a flight information providing program according to an embodiment of the present invention, and a computer-readable recording medium in which the flight information providing program is recorded (which will be referred to hereinafter simply as a recording medium). The recording medium stated herein is a medium capable of inducing changes of energy of magnetism, light, electricity, or the like according to the description contents of the program in a reading device provided as a hardware resource of a computer and transferring the description contents of the program to the reading device in the form of signals corresponding to the changes. Such a recording medium is, for example, a magnetic disk, an optical disk, a CD-ROM, a memory incorporated in the computer, or the like.

Figure 11:
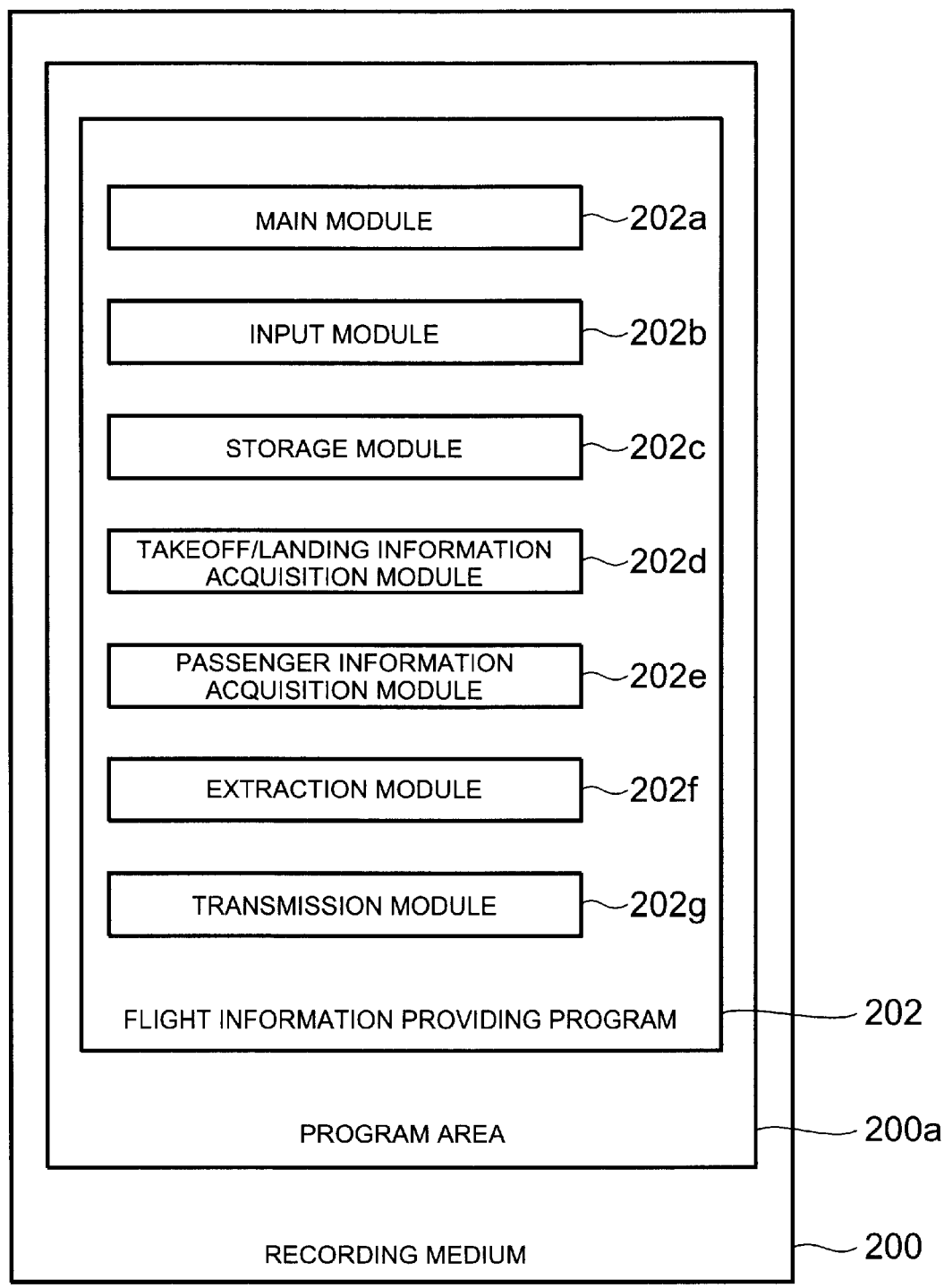
FIG. 11 is a block diagram of a recording medium.

FIG. 11 is a block diagram showing a configuration of a recording medium according to an embodiment of the present invention. The recording medium 200 is provided with a program area 200a for recording of the program, as shown in FIG. 11. The flight information providing program 202 is recorded in this program area 200a.

This flight information providing program 202 is a program for providing flight information on an airplane with a predetermined person aboard, and, as shown in FIG. 11, is configured to comprise a main module 202a for controlling the processing; an input module 202b for input of the information provision request; a storage module 202c for storage of the information provision request entered; a takeoff/landing information acquisition module 202d for acquiring the actual flight information 60 on takeoff/landing of each airplane; a passenger information acquisition module 202e for acquiring the actual boarding information 70 on passengers aboard each plane; an extraction module 202f for extracting the takeoff/landing information by the extraction processing of the takeoff information and the extraction processing of the landing information; and a transmission module 202g for transmitting the takeoff/landing information of the object airplane extracted, to the terminal unit 30 on the basis of the destination address about the person.

The functions implemented by the respective operations of the input module 202b, storage module 202c, takeoff/landing information acquisition module 202d, passenger information acquisition module 202e, extraction module 202f, and transmission module 202g are similar to the functions of the information provision request input section 12, storage section 18, takeoff/landing information acquisition section 14, passenger information acquisition section 16, extraction section 20, and transmission section 22, respectively, of the aforementioned flight information providing apparatus 10.

Figure 12:
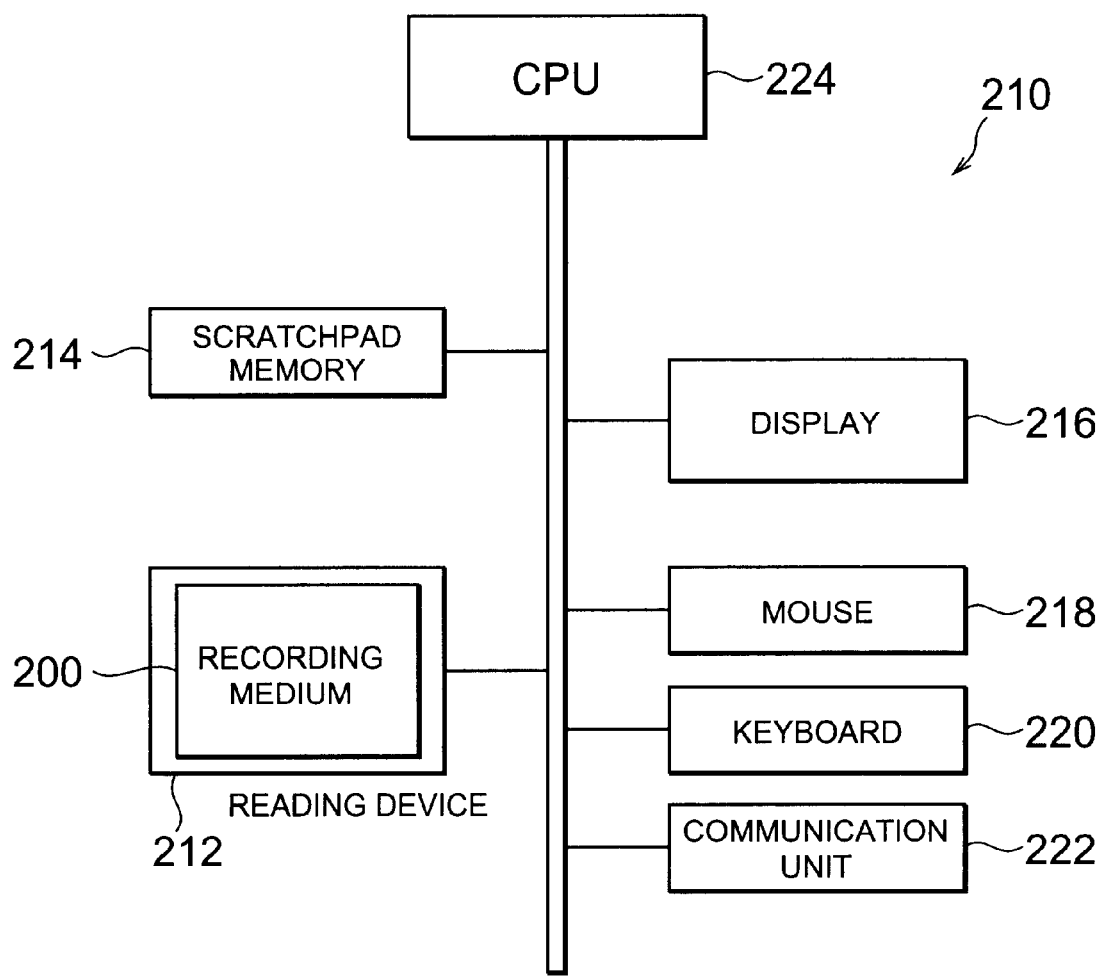
FIG. 12 is a block diagram showing a system configuration of a computer.
Figure 13:
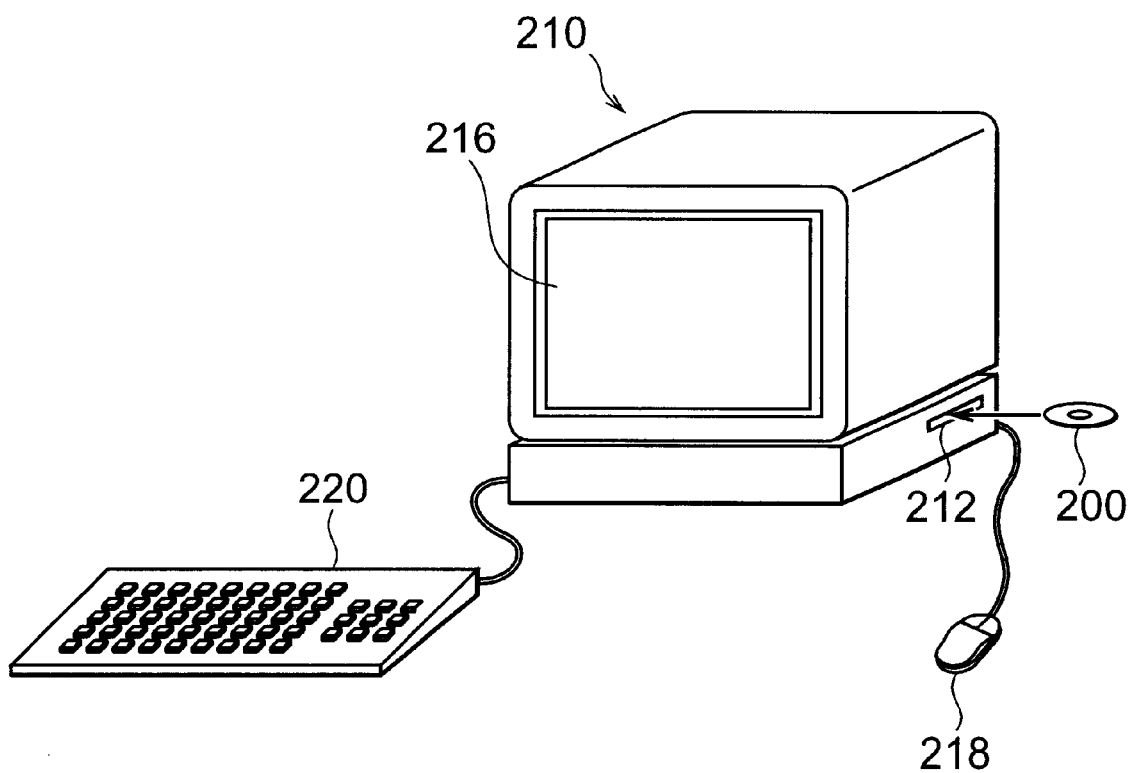
FIG. 13 is a perspective view of the computer.

FIG. 12 is a block diagram showing a system configuration of a computer (e.g., a server system) for executing the flight information providing program 202 recorded in the recording medium 200, and FIG. 13 a perspective view of the computer for executing the flight information providing program 202 recorded in the recording medium 200. The computer 210, as shown in FIGS. 12 and 13, is composed of a reading device 212, a scratchpad memory (RAM) 214, a display 216 as a display means, a mouse 218 and a keyboard 220 as input means, a communication unit 222 as a communication means, and a CPU 224 for controlling execution of the flight information providing program 202 and others. When the recording medium 200 is set in the reading device 212, the reading device 212 becomes able to make access to the information recorded in the recording medium 200 and the computer 210 can execute the flight information providing program 202 recorded in the program area 200a of the recording medium 200.

The reading device 212 is a flexible disk drive unit, a CD-ROM drive unit, a magnetic tape drive unit, or the like selected according to the recording medium 200.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A flight information providing apparatus adapted to provide flight information on an airplane with a predetermined person aboard, said flight information providing apparatus comprising:
    an information provision request input section for entering an information provision request including at least identification information on said person, identification information on an airplane that said person is supposed to go aboard, and a destination address to which the information is to be provided;
    a storage section for storing the information provision request entered;
    a takeoff/landing information acquisition section for acquiring actual flight information on takeoff/landing of an airplane;
    an extraction section for collating the identification information on the airplane that said person is supposed to go aboard, with said actual flight information thereof to extract landing information comprising arrival information indicating that said airplane has arrived, from said actual flight information; and
    a transmission section for transmitting the landing information of the object airplane extracted, to a terminal unit on the basis of the destination address about said person.

2. The flight information providing apparatus according to claim 1, wherein said extraction section is configured to extract the landing information further comprising difference information between an estimated time of arrival and an actual time of arrival about the object plane.

3. The flight information providing apparatus according to claim 1, wherein said extraction section is configured to extract the landing information further comprising information indicating that the object airplane has arrived at an airport different from an expected airport and information on the airport where the object airplane has arrived.

4. The flight information providing apparatus according to claim 1, further comprising a passenger information acquisition section for acquiring actual boarding information on passengers aboard an airplane,
    wherein said extraction section is configured to collate the identification information on said person and the identification information on the airplane that said person is supposed to go aboard, with said actual boarding information and said actual flight information to extract takeoff information comprising boarding information indicating that said person has actually gone aboard the expected airplane and that said airplane has taken off, from said actual boarding information and said actual flight information, and wherein said transmission section is configured to transmit the takeoff information of said person extracted, to said terminal unit.

5. The flight information providing apparatus according to claim 4, wherein said extraction section is configured to extract the takeoff information further comprising difference information between an estimated time of departure and an actual time of departure about the airplane that said person is supposed to go aboard.

6. The flight information providing apparatus according to claim 4, wherein said extraction section is configured to extract the landing information further comprising actual arrival information indicating that the airplane with said person actually aboard has arrived.

7. The flight information providing apparatus according to claim 1, wherein said information provision request comprises language selection information for selection of a language about the information transmitted from said transmission section, and wherein said extraction section is configured to manipulate said extracted information so as to be displayed in a language according to the language selection information.

8. The flight information providing apparatus according to claim 1, wherein said terminal unit is a portable terminal having a function of entering said information provision request to deliver the request to said information provision request input section and receiving the information transmitted from said transmission section to display the information.

9. The flight information providing apparatus according to claim 1, wherein said information provision request is entered through said information provision request input section when said person purchases an airline ticket or when said person checks in at an airport.

10. A flight information providing method adapted to provide flight information on an airplane with a predetermined person aboard, said flight information providing method comprising:

an input step of entering an information provision request including at least identification information on said person, identification information on an airplane that said person is supposed to go aboard, and a destination address to which the information is to be provided;

a storage step of storing the information provision request entered;

an acquisition step of acquiring actual flight information on takeoff/landing of an airplane;

an extraction step of collating the identification information on the airplane that said person is supposed to go aboard, with said actual flight information thereof to extract landing information comprising arrival information indicating that said airplane has arrived, from said actual flight information; and a transmission step of transmitting the landing information of the object airplane extracted, to a terminal unit on the basis of the destination address about said person.

11. The flight information providing method according to claim 10, wherein said extraction step is configured to extract the landing information further comprising difference information between an estimated time of arrival and an actual time of arrival about the object plane.

12. The flight information providing method according to claim 10, wherein said extraction step is configured to extract the landing information further comprising information indicating that the object airplane has arrived at an airport different from an expected airport and information on the airport where the object airplane has arrived.

13. The flight information providing method according to claim 10, wherein said acquisition step is configured to also acquire actual boarding information on passengers aboard an airplane, wherein said extraction step is configured to collate the identification information on said person and the identification information on the airplane that said person is supposed to go aboard, with said actual boarding information and said actual flight information to extract takeoff information comprising boarding information indicating that said person has actually gone aboard the expected airplane and that said airplane has taken off, from said actual boarding information and said actual flight information, and wherein said transmission step is configured to transmit the takeoff information of said person extracted, to said terminal unit.

14. The flight information providing method according to claim 13, wherein said extraction step is configured to extract the takeoff information further comprising difference information between an estimated time of departure and an actual time of departure about the airplane that said person is supposed to go aboard.

15. The flight information providing method according to claim 13, wherein said extraction step is configured to extract the landing information further comprising actual arrival information indicating that the airplane with said person actually aboard has arrived.

16. The flight information providing method according to claim 10, wherein said input step is configured to enter the information provision request further comprising language selection information for selection of a language about the information transmitted at said transmission step, and wherein said extraction step is configured to manipulate said extracted information so as to be displayed in a language according to the language selection information.

17. The flight information providing method according to claim 10, wherein said terminal unit is a portable terminal having a function of entering the information provision request at said input step and receiving and displaying the information transmitted at said transmission step.

18. The flight information providing method according to claim 10, wherein said input step is configured to enter said information provision request when said person purchases an airline ticket or when said person checks in at an airport.

19. A flight information providing program adapted to provide flight information on an airplane with a predetermined person aboard, said flight information providing program being configured to make a computer execute the following steps:

an input step of entering an information provision request including at least identification information on said person, identification information on an airplane that said person is supposed to go aboard, and a destination address to which the information is to be provided;

a storage step of storing the information provision request entered;

an acquisition step of acquiring actual flight information on takeoff/landing of an airplane;

an extraction step of collating the identification information on the airplane that said person is supposed to go aboard, with said actual flight information thereof to extract landing information comprising arrival information indicating that said airplane has arrived, from said actual flight information; and a transmission step of transmitting the landing information of the object airplane extracted, to a terminal unit on the basis of the destination address about said person.

20. The flight information providing program according to claim 19, wherein said extraction step is configured to extract the landing information further comprising difference information between an estimated time of arrival and an actual time of arrival about the object plane.

21. The flight information providing program according to claim 19, wherein said extraction step is configured to extract the landing information further comprising information indicating that the object airplane has arrived at an airport different from an expected airport and information on the airport where the object airplane has arrived.

22. The flight information providing program according to claim 19, wherein said acquisition step is configured to also acquire actual boarding information on passengers aboard an airplane, wherein said extraction step is configured to collate the identification information on said person and the identification information on the airplane that the person is supposed to go aboard, with said actual boarding information and said actual flight information to extract takeoff information comprising boarding information indicating that said person has actually gone aboard the expected airplane and that said airplane has taken off, from said actual boarding information and said actual flight information, and wherein said transmission step is configured to transmit the takeoff information of said person extracted, to said terminal unit.

23. The flight information providing program according to claim 22, wherein said extraction step is configured to extract the takeoff information further comprising difference information between an estimated time of departure and an actual time of departure about the airplane that said person is supposed to go aboard.

24. The flight information providing program according to claim 22, wherein said extraction step is configured to extract the landing information further comprising actual arrival information indicating that the airplane with said person actually aboard has arrived.

25. The flight information providing program according to claim 19, wherein said input step is configured to enter the information provision request further comprising language selection information for selection of a language about the information transmitted at said transmission step, and wherein said extraction step is configured to manipulate said extracted information so as to be displayed in a language according to the language selection information.

26. The flight information providing program according to claim 19, wherein said terminal unit is a portable terminal having a function of entering the information provision request at said input step and receiving and displaying the information transmitted at said transmission step.

27. The flight information providing program according to claims 19, wherein said input step is configured to enter said information provision request when said person purchases an airline ticket or when said person checks in at an airport.

28. A computer-readable recording medium in which the flight information providing program as set forth in claim 19 is recorded.

* * * * *